Aug. 3, 1926.
M. J. McLAUGHLIN ET AL
1,594,788
SCREEN
Filed Jan. 30, 1925
Fig.1.
Fig.2.
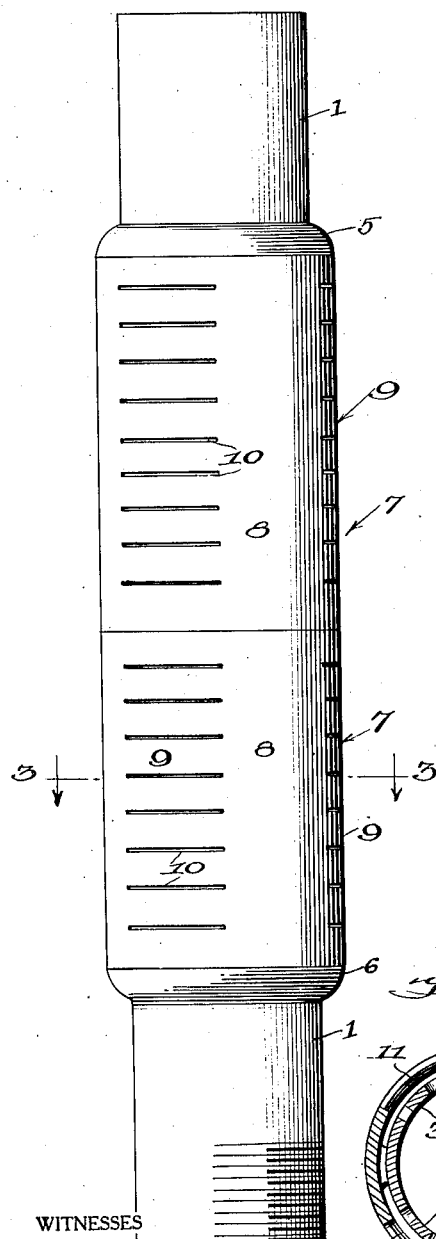
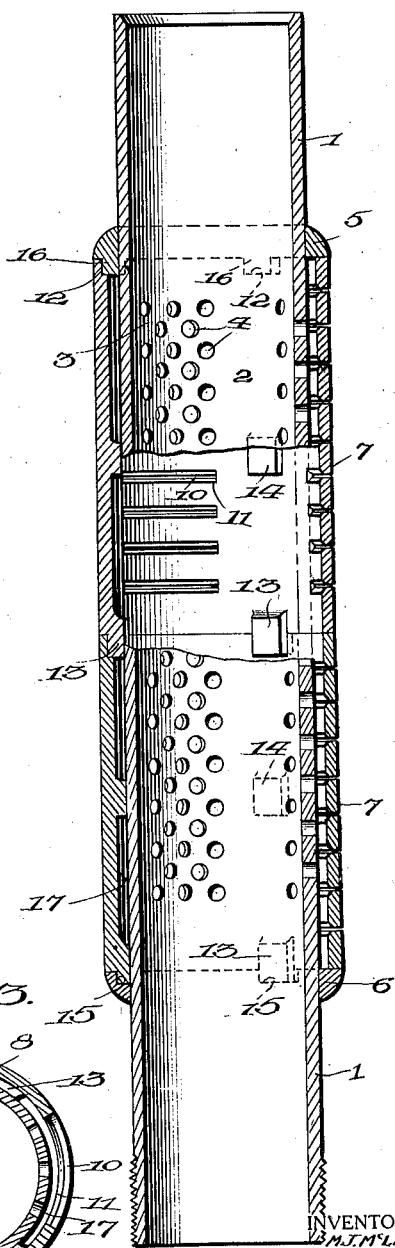
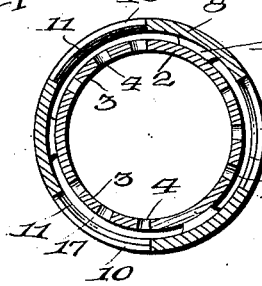
Fig.3.
WITNESSES
INVENTOR
M. J. M°LAUGHLIN,
D. J. HARRISON,
BY
ATTORNEYS Patented Aug. 3, 1926.

1,594,788

UNITED STATES PATENT OFFICE.

MALACHA JOSEPH McLAUGHLIN AND DANIEL JEFFERSON HARRISON, OF HOUSTON, TEXAS.

SCREEN.

Application filed January 30, 1925. Serial No. 5,858.

Our invention relates generally to improvements in screens, more particularly to an improved tubular screen adapted for application to a perforated well tube or the like, and it consists in the combinations, constructions and arrangements herein described and claimed.

An object of the invention is to provide a screen of the character described which will afford facilities for preventing passage of sand, small stones, and like objects, between the space within a perforated tube to which the screen has been applied and the space surrounding the screen.

A further object of the invention is the provision of a screen of the character described having a body adapted to surround a perforated tube and having means for spacing the body from the perforated tube so that an annular space will be provided between the strainer body and the tube for the free passage of fluid through the perforations of the tube to the interior thereof, the strainer body having spaced slots through which fluid may pass to the space between the strainer body and perforated tube.

A further object of the invention is the provision of a strainer of the character described which is formed with a slotted body and in such manner, as to permit practically unrestricted movement of fluid from the space surrounding the strainer body to the interior thereof without undue wear on the walls of the slots of the body.

A still further object of the invention is the provision of a slotted screen body and perforated tube construction which will be extremely strong and durable in use, and at the same time will permit practically free movement of fluid from the space surrounding the strainer body to the interior of the tube, and will exclude sand, small stones, and the like.

Other objects and advantages of the invention will be apparent from the following description considered in conjunction with the accompanying drawings, in which:—

Figure 1 is a side elevation of a well tube equipped with a strainer embodying the invention, Figure 2 is a longitudinal central section through the construction exhibited in Figure 1, with a portion of the perforated tube broken away to show the internal construction of the strainer body, Figure 3 is a section substantially along the line 3—3 of Figure 1.

In carrying out the invention, we make use of a tube 1 which may be the usual tube of an oil well. The tube 1 is formed for part of its length to provide alternating longitudinally extending imperforate portions 2 and apertured portions 3 having spaced radially extending openings as indicated at 4. The relative widths of the imperforate portions 2 and the perforated portions 3 of the tube 1 may vary according to the thickness of the tube 1 or other particular requirements in a given case, but preferably are approximately equal, as shown. The strainer body comprises a pair of collars or retaining rings 5 and 6 respectively, and a plurality of tubular sections 7 which are arranged in longitudinal series on the tube 1 between the collars 5 and 6. The collars 5 and 6 are adapted to fit closely on the tube 1 and preferably taper toward their outer ends as shown. The greatest outer diameter of each collar 5 and 6 is not greater than the outer diameter of each section 7 and preferably is the same as the outer diameter of each section 7. The inner diameter of each section 7 is greater than the outer diameter of the tube 1 and each tubular section 7 is formed to provide alternating longitudinally extending imperforate portions 8 and other portions 9 which are apertured by transversely extending spaced slits 10. The width of each apertured portion 9 preferably is the same as the width of each imperforate portion 8 of the tubular section 7, although the relative widths of the perforate portions 9 and the imperforate portions 8 may vary according to particular requirements in a given case. The collars 5 and 6 are arranged at opposite ends of the hereinbefore mentioned portion of the tube 1 having the alternating longitudinally extending imperforate portions 2 and perforate portions 3 and the number and relative arrangement of the perforate portions 9 of each tubular section 7 corresponds with the number and arrangement of the perforate portions 3 of the tube 1. Each slit 10 is widened adjacent to its inner end to provide a groove 11, as best seen in Figure 2, each groove 11 preferably being V-shaped in cross section as shown. Each groove 11 preferably is coextensive in length with the slit 10 into which it is merged.

Each tubular section 7 is formed with sockets 12 in the inner walls of the imperforate portions 2 at one end of the tubular section and with inwardly offset integral lugs 13 on the imperforate portions 2 at the opposite end of the tubular section, the respective lugs 13 being in alinement longitudinally of the section with the corresponding sockets 12. Each lug 13 extends for part of its length on the tubular section inwardly of the adjacent end of the latter, and extends for the remainder of its length beyond the adjacent end of the tubular section, and therefore, is adapted to enter the corresponding socket 12 in the adjacent tubular section 7 when the adjacent tubular sections 7 are arranged on the perforated tube 1 as shown in the drawings, and as best seen in Figure 2.

Each tubular section 7 also is formed with other lugs 14 extending inwardly on the imperforate portions 2 of that tubular section, there preferably being a lug 14 between the alined lug 13 and socket 12 of each imperforate portion 2 midway between the ends of the tubular section. The thickness of each lug 14 preferably is the same as that of each lug 13 so that both the lugs 13 and 14 serve as spacing lugs to space the tubular section 7 from the outer wall of the tube 1. The collar 6 is provided with sockets 15 similar to the sockets 12 for the reception of the lugs 13 on the adjacent tubular section 7. The collar 5 is provided at its inner end with lugs 16 similar to the lugs 13 for engaging with the sockets 12 in the adjacent tubular section 7.

From the foregoing description of the various parts of the device, the operation thereof may be readily understood. The greatest use of the screen will be in connection with the usual tube of an oil well, although it is capable of use with any perforated tube. As is well known, the perforated tube extends downward in a well bore through sand, and it is necessary that the sand be excluded from the tube without materially restricting the flow of oil or like fluid into the well tube. The portion of the well tube at the lower end of the sand has one of the collars 5 or 6 (in the construction illustrated in the drawings, the collar 6), rigidly secured thereto by welding or such collar may be integral with the well tube. As many of the sections 7 as are required to extend through the sand are arranged on the well tube which is perforated at intervals along its circumference as hereinbefore described. The sections 7 are arranged relatively so that the lower section is locked to the collar 6 and each succeeding section 7 is locked to the next lower section by means of the hereinbefore described lugs and sockets and the sections 7 thus are held in concentric spaced relation to the tube 1 and against turning about the axis of the latter.

The other collar which in the construction exhibited in the drawings, is the collar 5, then is arranged against the upper end of the upper section 7 so that the lugs 16 thereon enter the sockets 12 of the upper tubular section 7. The collar 5 then is secured to the tube 1, preferably by welding so that it will be rigid with the tube. The outer surface of the strainer body will be free from any protrusions which would interfere with the vertical movement of the tube 1 with the strainer body thereon in the bore of a well or the forcing of the well tube through sand or like formation. It of course will be understood that the strainer body is arranged on the well tube before the latter is projected downwardly to a desired position in the well. Since the slits 10 are relatively narrow, practically all the sand, small stones and like foreign matter will be excluded from the interior of the screen, while the fluid will be permitted to pass through the slits 10 into the annular space, indicated at 17, which is provided between the tubular sections 7 and the well tube. In actual practice, however, some sand will pass through the slits and it is of advantage that the grooves 11 be sufficiently shallow to provide a wearing surface for the sand of sufficient area to preclude impairment of the strainer in an unduly short time and to provide the desired strength and durability, while it also is desirable that the grooves 11 shall be of sufficient depth and the slits 10 therefore commensurately shallow to permit practically unrestricted flow of fluid from the exterior of the strainer body into the space between the strainer body and well tube, without weakening the strainer body. The depth of the grooves 11 therefore may be varied to correspondingly vary the depth of the slits 10 according to particular requirements for satisfactory use of the device under particular conditions, which of course, will be determined by the size and nature of the sand particles, pressure at which the fluid is forced into the strainer body and the like. An important advantage which the invention provides is that the rate of wearing of the walls of the slits through which fluid passes into the space 17 varies according to the depth of the grooves 10, and therefore is capable of control, while the strainer body will be strong and durable, irrespective of whether the grooves 11 are relatively shallow or relatively deep. The perforate portion of the well tube 1 also will be relatively strong and durable for a pipe formed of metal of a given gage, since the tube 1 is apertured only for part of its circumference.

Since an annular space is provided between the body of the strainer and the well tube, fluid entering such space can pass freely to any of the perforations 4 and through the latter into the tube 1 without the velocity of the fluid being lessened.

Obviously, our invention is susceptible of embodiment in forms other than that which is illustrated in the accompanying drawings, and we therefore consider as our own all such modifications and adaptations thereof as fairly fall within the scope of the appended claims.

We claim:—

1. A screen comprising a plurality of tubular sections, each having the wall thereof formed to consist of alternating apertured and imperforate portions extending longitudinally of the section, and each having inwardly extending spaced lugs on said imperforate portions for spacing the wall of said section from an inner tube, certain of said lugs extending beyond one end of said tubular section inwardly of the outer periphery thereof, said tubular section having sockets in the imperforate portions thereof at its opposite end corresponding in number and relative arrangement with the lugs at the first named end of the tubular section, corresponding lugs and sockets at meeting ends of adjacent sections being co-engaged, a collar having sockets in its inner face at its inner end for the reception of the extending lugs at the adjacent end of the adjacent tubular section, and a second collar having lugs on its inner face extending beyond the inner end of the collar for engagement with the sockets at the end of the tubular section which is adjacent to said second named collar.

2. In combination, a tube having a portion formed with circumferentially spaced series of spaced apertures in the wall thereof, the wall of said tube being imperforate between said series of apertures, a screen comprising a tubular body having a length slightly greater than the perforated portion of said first named tube, and having an inner diameter greater than the outer diameter of the said first named tube, said screen body being formed to comprise alternating longitudinally extending imperforate and slitted portions, the slitted portions corresponding in number with the apertured portions of the wall of said first named tube, said screen body having lugs on its inner face for spacing said screen body from the outer wall of the first named tube, certain of said lugs extending beyond one end of the screen body, a collar rigidly secured on said first named tube at one end of the perforated portion thereof and having sockets in its inner face at the inner end thereof for the reception of the lugs at the adjacent end of said screen body, and a second collar secured on said first named tube at the opposite end of the apertured portion thereof, said second collar having lugs at its inner end fitting in the sockets in the adjacent end portion of the screen body, whereby said screen body is held against turning on the first named tubular member and the apertured portions of the wall of the screen body are disposed radially outward from the perforated portions of the wall of the first named tube.

MALACHA JOSEPH McLAUGHLIN.
DANIEL JEFFERSON HARRISON.